(12) United States Patent
Yamazaki

(10) Patent No.: US 12,511,780 B2
(45) Date of Patent: Dec. 30, 2025

(54) DEVICE, METHOD, AND COMPUTER PROGRAM FOR ESTIMATING SEAT POSITION

(71) Applicant: TOYOTA JIDOSHA KABUSHIKI KAISHA, Toyota (JP)

(72) Inventor: Masayuki Yamazaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 478 days.

(21) Appl. No.: 18/198,432

(22) Filed: May 17, 2023

(65) Prior Publication Data

US 2023/0394702 A1    Dec. 7, 2023

(30) Foreign Application Priority Data

Jun. 1, 2022   (JP) .................... 2022-089735

(51) Int. Cl.
| | | |
|---|---|---|
| *G06T 7/73* | (2017.01) | |
| *G06T 7/11* | (2017.01) | |
| *G06T 7/13* | (2017.01) | |
| *G06V 10/22* | (2022.01) | |
| *G06V 10/764* | (2022.01) | |
| *G06V 20/59* | (2022.01) | |

(52) U.S. Cl.
CPC ............ *G06T 7/74* (2017.01); *G06T 7/11* (2017.01); *G06T 7/13* (2017.01); *G06V 10/22* (2022.01); *G06V 10/764* (2022.01); *G06V 20/59* (2022.01); *G06T 2207/30268* (2013.01)

(58) Field of Classification Search
CPC .... G06T 7/73; G06T 7/13; G06T 7/11; G06V 10/22; G06V 10/764; G06V 20/59
See application file for complete search history.

(56) References Cited

U.S. PATENT DOCUMENTS

| | | | |
|---|---|---|---|
| 2004/0040772 A1 | 3/2004 | Ertl et al. | |
| 2007/0289800 A1* | 12/2007 | Aoki ................. | G06V 40/103 180/271 |
| 2013/0230256 A1* | 9/2013 | Deng ................. | G06F 40/197 382/218 |

(Continued)

FOREIGN PATENT DOCUMENTS

| | | |
|---|---|---|
| JP | 2004-516470 A | 6/2004 |
| JP | 2017-024653 A | 2/2017 |

(Continued)

*Primary Examiner* — John B Strege
(74) *Attorney, Agent, or Firm* — Oliff PLC

(57) ABSTRACT

A device for estimating a seat position includes a processor configured to generate a mask image by masking a region representing a driver in a driver image representing the interior of a vehicle and generated by a camera while the driver is in the vehicle, generate one or more difference images based on the difference between the mask image and each of one or more reference images among which the position of a driver's seat differs, determine an individual estimate of the position of the driver's seat for each of the one or more difference images by inputting each of the difference images into a classifier, and calculate a statistically representative value of the individual estimates determined for the respective difference images as an estimate of the position of the driver's seat.

6 Claims, 9 Drawing Sheets

(56) References Cited

U.S. PATENT DOCUMENTS

| | | | | |
|---|---|---|---|---|
| 2014/0218268 A1* | 8/2014 | Olesen | ............... | G06V 20/597 |
| | | | | 345/7 |
| 2015/0186715 A1* | 7/2015 | Zhao | ................. | G06V 40/103 |
| | | | | 382/103 |
| 2017/0028987 A1 | 2/2017 | Yamada | | |
| 2017/0166122 A1* | 6/2017 | Ando | ................. | G06V 20/582 |
| 2018/0232636 A1 | 8/2018 | Kawaguchi | | |
| 2019/0057264 A1* | 2/2019 | Schmidt | ............... | B60R 11/04 |
| 2019/0370580 A1 | 12/2019 | Aoi et al. | | |
| 2020/0189572 A1* | 6/2020 | Rowell | ............... | G06V 40/19 |
| 2020/0257371 A1* | 8/2020 | Sung | ................... | G06V 40/10 |
| 2021/0334564 A1* | 10/2021 | Park | .................... | G06V 40/161 |
| 2023/0058530 A1* | 2/2023 | Kang | .................... | G06T 7/70 |

FOREIGN PATENT DOCUMENTS

| | | | |
|---|---|---|---|
| JP | 2018-132996 A | 8/2018 | |
| JP | 2018-152034 A | 9/2018 | |
| JP | 2019-133446 A | 8/2019 | |
| JP | 2020-042422 A | 3/2020 | |

* cited by examiner

FIG. 7

| REFERENCE IMAGES | 10 DEGREES | 15 DEGREES | 20 DEGREES | 25 DEGREES | 30 DEGREES | 35 DEGREES | 40 DEGREES |
|---|---|---|---|---|---|---|---|
| 0 | | | | ★ | | | |
| 1 | | | ★ | | | | |
| 2 | | | | | | | |
| 3 | | | ★ | | | | |
| 4 | | | | | | | |
| 5 | | ★ | | | | | |
| 6 | | | | ★ | | | |
| 7 | | | | ★ | | | |
| 8 | | | ★ | | | | |
| 9 | | | | ★ | | | |
| 10 | | | ★ | | | | |
| 11 | | | | | ★ | | |

701

DEVICE, METHOD, AND COMPUTER PROGRAM FOR ESTIMATING SEAT POSITION

FIELD

The present invention relates to a device, a method, and a computer program for estimating the position of the driver's seat of a vehicle from an image representing the vehicle interior.

BACKGROUND

Determining whether a vehicle driver is in a state suitable for driving the vehicle on the basis of an image obtained by taking pictures of the driver's face with an imaging device has been studied. To determine a driver's state, it is desirable to detect the driver's face accurately from an image. However, the position and size of a driver's face in an image vary depending on the position of the driver's seat. Thus, to detect a driver's face accurately from an image, it is preferable that the position of the driver's seat can be estimated.

Regarding an occupant protection system, a method for determining the position of a vehicle seat has been proposed (see Japanese Unexamined Patent Publication JP2004-516470A). The method disclosed in JP2004-516470A includes registering an image area in the interior of a vehicle by a camera, and transmitting image information registered by the camera to an evaluation unit. The method further includes selecting a specified section containing a characteristic feature of the vehicle seat from the image area, and determining the position of the characteristic feature of the vehicle seat from the image area registered in the specified section. As the specified section is registered an area enclosed by two planes which contain and/or touch a side surface of the vehicle seat facing the camera.

SUMMARY

While a driver is in a vehicle, most of the driver's seat viewed from an imaging device is covered by the driver. It is therefore desirable that the position of the driver's seat can be estimated from an image even if most of the driver's seat is covered by the driver in the image.

It is an object of the present invention to provide a device that can estimate the position of a driver's seat from an image representing the interior of a vehicle.

According to an embodiment, a device for estimating a seat position is provided. The device includes a memory configured to store one or more reference images representing the interior of a vehicle where a driver's seat of the vehicle is at a predetermined position that differs among the one or more reference images; and a processor configured to: identify a region representing a driver in a driver image generated while the driver is in the vehicle by a camera provided to take pictures of the interior of the vehicle, generate a mask image by masking the identified region, generate one or more difference images based on the difference between the mask image and each of the one or more reference images, determine an individual estimate of the position of the driver's seat for each of the one or more difference images by inputting each of the difference images into a classifier which has been trained to estimate the position of the driver's seat, and calculate a statistically representative value of the individual estimates for the one or more difference images as an estimate of the position of the driver's seat.

In the device, a tolerable range of the position of the driver's seat is preferably set for each of the one or more reference images. The processor preferably calculates a statistically representative value of individual estimates included in the respective tolerable ranges of the reference images corresponding to the difference images among the individual estimates of the position of the driver's seat determined for the one or more difference images, as the estimate of the position of the driver's seat.

In the device, the processor preferably generates an edge mask image by applying an edge detection filter to the mask image, and generates the one or more difference images based on the difference between the edge mask image and each of one or more edge reference images obtained by applying the edge detection filter to the one or more reference images.

In the device, the one or more reference images preferably further represent steering of the vehicle whose position differs among the reference images. The processor is preferably further configured to determine an individual estimate of the position of the steering for each of the one or more difference images by inputting each of the difference images into a second classifier which has been trained to estimate the position of the steering, and calculate a statistically representative value of the individual estimates of the position of the steering for the one or more difference images as an estimate of the position of the steering.

According to another embodiment, a method for estimating a seat position is provided. The method includes identifying a region representing a driver in a driver image generated while the driver is in a vehicle by a camera provided to take pictures of the interior of the vehicle; generating a mask image by masking the identified region; generating one or more difference images based on the difference between the mask image and each of one or more reference images representing the interior of the vehicle where a driver's seat of the vehicle is at a predetermined position that differs among the one or more reference images; determining an individual estimate of the position of the driver's seat for each of the one or more difference images by inputting each of the difference images into a classifier that has been trained to estimate the position of the driver's seat; and calculating a statistically representative value of the individual estimates for the one or more difference images as an estimate of the position of the driver's seat.

According to still another embodiment, a non-transitory recording medium that stores a computer program for estimating a seat position is provided. The computer program includes instructions causing a processor mounted on a vehicle to execute a process including identifying a region representing a driver in a driver image generated while the driver is in the vehicle by a camera provided to take pictures of the interior of the vehicle; generating a mask image by masking the identified region; generating one or more difference images based on the difference between the mask image and each of one or more reference images representing the interior of the vehicle where a driver's seat of the vehicle is at a predetermined position that differs among the one or more reference images: determining an individual estimate of the position of the driver's seat for each of the one or more difference images by inputting each of the difference images into a classifier that has been trained to estimate the position of the driver's seat; and calculating a statistically representative value of the individual estimates for the one or more difference images as an estimate of the position of the driver's seat.

The device according to the present disclosure has an advantageous effect of being able to estimate the position of a driver's seat from an image representing the interior of a vehicle.

BRIEF DESCRIPTION OF DRAWINGS

FIG. 7 is a diagram for explaining the relationship between tolerable ranges of the position of the driver's seat that are set for respective reference images, estimates of the position calculated by a first classifier, and a finally estimated position of the driver's seat.

DESCRIPTION OF EMBODIMENTS

A device for estimating a seat position as well as a method and a computer program therefor executed by the device will now be described with reference to the attached drawings. The device estimates the positions of a driver's seat and steering, based on an image representing the interior of a vehicle where a driver is riding; the image is generated by a camera for monitoring a driver provided in the vehicle interior. To achieve this, the device identifies a region representing the driver in the image by background subtraction between the image representing the vehicle interior with the driver and a background image representing the vehicle interior without a driver. Subsequently, the device generates a mask image in which the identified region is masked, and generates a difference image between the mask image and each of at least one reference image representing the vehicle interior where the seat and the steering are at predetermined positions. The device inputs the generated difference images into classifiers for estimating the positions of the seat and the steering to obtain estimates of the positions of the seat and the steering.

The following describes an example in which the device for estimating a seat position is mounted on a vehicle control system that monitors a driver's state and that assists in driving, depending on the driver's state.

Figure 1:
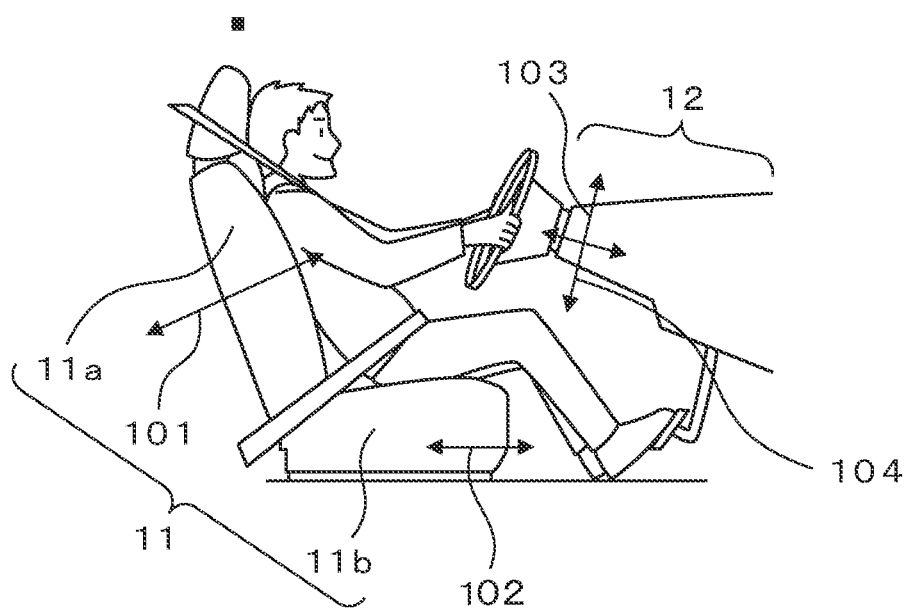
FIG. 1 is a diagram for explaining the positions of a driver's seat and steering to be estimated.

FIG. 1 is a diagram for explaining the positions of a driver's seat and steering to be estimated. In the present embodiment, the slope angle of a backrest 11a of a driver's seat 11 adjustable in the direction indicated by an arrow 101 and the position in a depth direction of a seating surface 11b of the driver's seat 11 adjustable in the direction indicated by an arrow 102 are the position of the driver's seat to be estimated. The position in an up-and-down direction of steering 12 adjustable in the direction indicated by an arrow 103 and the position in a depth direction of the steering 12, which is also adjustable in the direction indicated by an arrow 104, are the position of the steering to be estimated. The position of the driver's seat to be estimated is not limited to the above, and may also include the position in a height direction of the seating surface 11b of the driver's seat.

Figure 2:
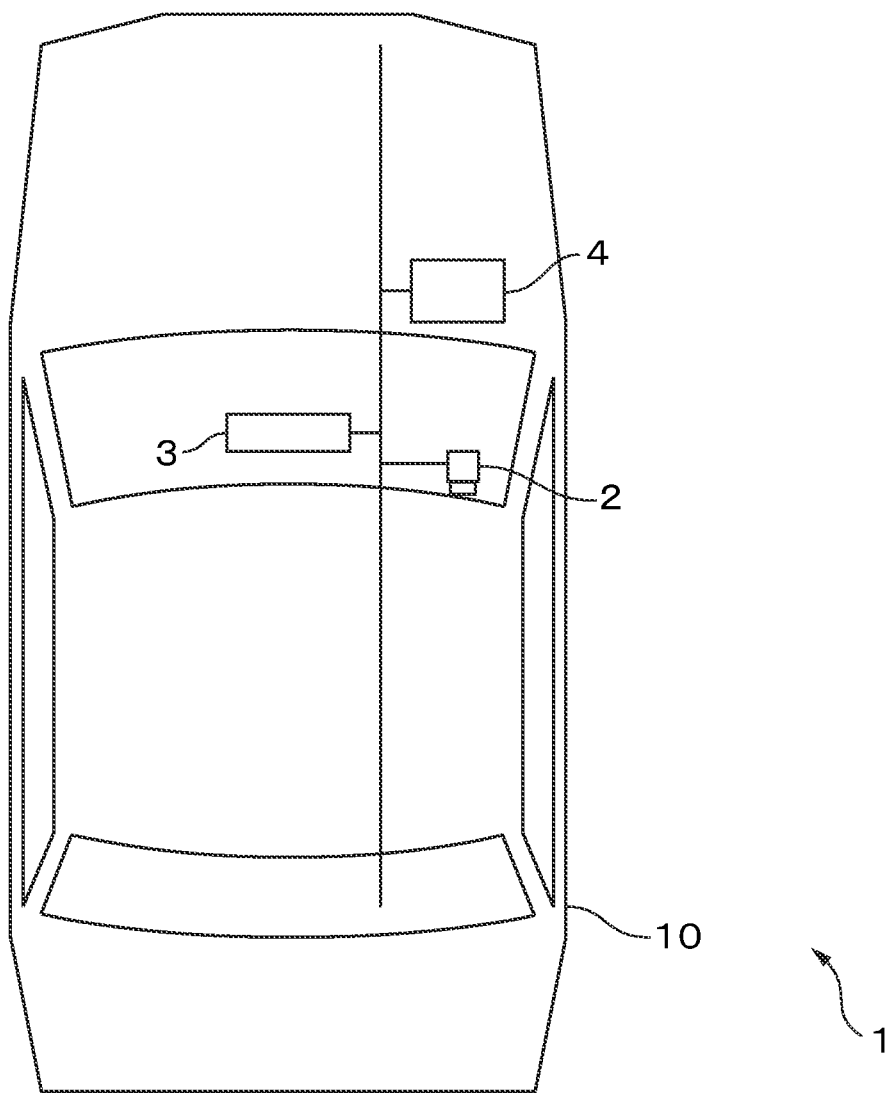
FIG. 2 schematically illustrates the configuration of a vehicle control system including a device for estimating a seat position.

FIG. 2 schematically illustrates the configuration of a vehicle control system including the device for estimating a seat position. In the present embodiment, the vehicle control system 1, which is mounted on a vehicle 10 and controls the vehicle 10, includes a driver monitoring camera 2, a notification device 3, and an electronic control unit (ECU) 4, which is an example of the device for estimating a seat position. The driver monitoring camera 2 and the notification device 3 are communicably connected to the ECU 4 via an in-vehicle network conforming to a communication standard, such as a controller area network. The vehicle control system 1 may include a vehicle exterior camera (not illustrated) that takes pictures of a region around the vehicle 10 to generate images representing the surrounding region, or a distance sensor (not illustrated) that measures the distances from the vehicle 10 to objects around the vehicle 10, such as LiDAR or radar. The vehicle control system 1 may further include a measurement device (not illustrated) for measuring the position of the vehicle 10 on the basis of signals from satellites, such as a GPS receiver; a navigation device (not illustrated) for searching for a planned travel route to a destination; and a storage device (not illustrated) that stores map information referred to in autonomous driving control of the vehicle 10.

The driver monitoring camera 2, which is an example of the image capturing unit, includes a two-dimensional detector constructed from an array of optoelectronic transducers, such as CCD or C-MOS, having sensitivity to visible or infrared light and a focusing optical system that forms an image of a target region on the two-dimensional detector. The driver monitoring camera 2 may further include a light source, such as an infrared LED, for illuminating the driver. The driver monitoring camera 2 is provided in the vehicle interior so that the face of a driver sitting on the driver's seat of the vehicle 10 may be included in the target region, i.e., so that pictures of the driver's face can be taken. For example, the driver monitoring camera 2 is mounted on or near an instrument panel or on the steering and oriented to the driver. The driver monitoring camera 2 takes pictures of the target region every predetermined capturing period (e.g., 1/30 to 1/10 seconds) and generates images representing the target region (hereafter, "driver images"). Each driver image obtained by the driver monitoring camera 2 is an example of an interior image representing the interior of the vehicle 10, and may be a color or grayscale image. Every time a driver image is generated, the driver monitoring camera 2 outputs the generated driver image to the ECU 4 via the in-vehicle network.

The notification device 3 is provided in the interior of the vehicle 10, and makes predetermined notification to the driver by light, voice, vibration, or display of characters or an image. To achieve this, the notification device 3 includes, for example, at least one of a speaker, a light source, a vibrator, or a display. When notification indicating a warning to the driver is received from the ECU 4, the notification device 3 notifies the driver of the warning by a voice from the speaker, lighting up or blinking of the light source, vibration of the vibrator, or a warning message on the display.

The ECU 4 controls driving the vehicle 10 or assists the driver in driving the vehicle according to a driving control level applied to the vehicle 10. Further, the ECU 4 monitors the driver, based on driver images received from the driver monitoring camera 2, and detects the driver's abnormal condition. When it is determined that the driver's condition is abnormal, the ECU 4 warns the driver or controls the vehicle 10 so that the vehicle 10 makes an emergency stop. Further, the ECU 4 estimates the positions of the driver's seat and the steering, based on a driver image, at predetermined timing. The ECU 4 reflects the result of estimation in a detection condition for detecting the driver's face from a driver image, aiming at improving the accuracy of detection of the driver's face and estimation of the driver's state.

Figure 3:
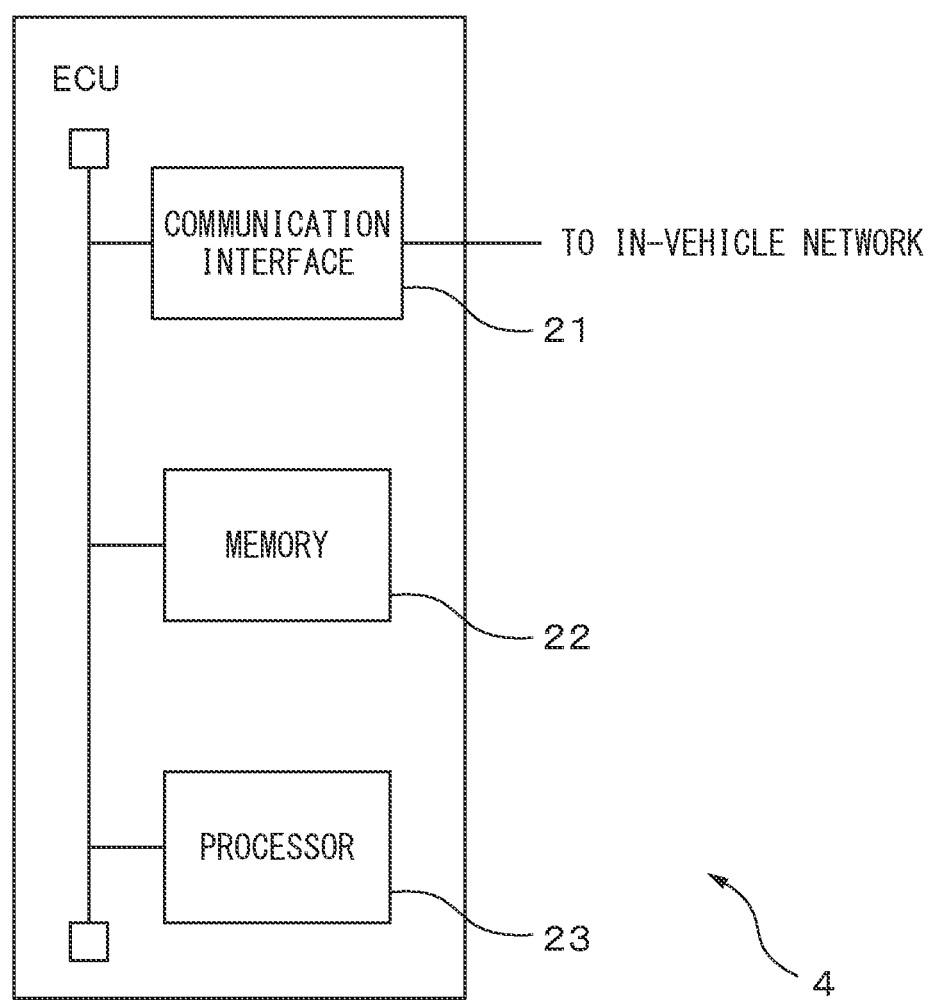
FIG. 3 illustrates the hardware configuration of an ECU, which is an example of the device for estimating a seat position.

FIG. 3 illustrates the hardware configuration of the ECU 4. As illustrated in FIG. 3, the ECU 4 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 4 to the in-vehicle network. Every time a driver image is received from the driver monitoring camera 2, the communication interface 21 passes the received driver image to the processor 23. Further, when information to be notified to the driver via the notification device 3, such as notification indicating a warning to the driver, is received from the processor 23, the communication interface 21 outputs the information to the notification device 3.

The memory 22, which is an example of the storage unit, includes, for example, volatile and nonvolatile semiconductor memories, and stores various algorithms and various types of data used in a seat position estimation process executed by the processor 23 of the ECU 4. For example, the memory 22 stores various types of data and various parameters used for estimating the positions of the driver's seat and the steering or detecting the driver. Examples of such data include a background image representing the interior of the vehicle 10 where there is not a driver and one or more reference images representing the vehicle interior where the driver's seat and the steering are at predetermined positions. The memory 22 further stores a detection condition table representing the relationship between estimates of the positions and detection conditions of the driver's face. The memory 22 further stores parameters for specifying a criterion for determining whether the driver's condition is abnormal (hereafter simply a "criterion of abnormality"). In addition, the memory 22 temporarily stores driver images, various types of data generated during the seat position estimation process, and estimates of the positions obtained as a result of the position estimation process. In addition, the memory 22 stores various parameters and various types of data used for driving control of the vehicle 10. Such data includes images generated by the vehicle exterior camera, ranging signals generated by the distance sensor, positioning signals indicating the position of the vehicle 10 generated by the GPS receiver, a planned travel route generated by the navigation device, and map information.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a control process for driving the vehicle including the seat position estimation process, at predetermined intervals.

Figure 4:
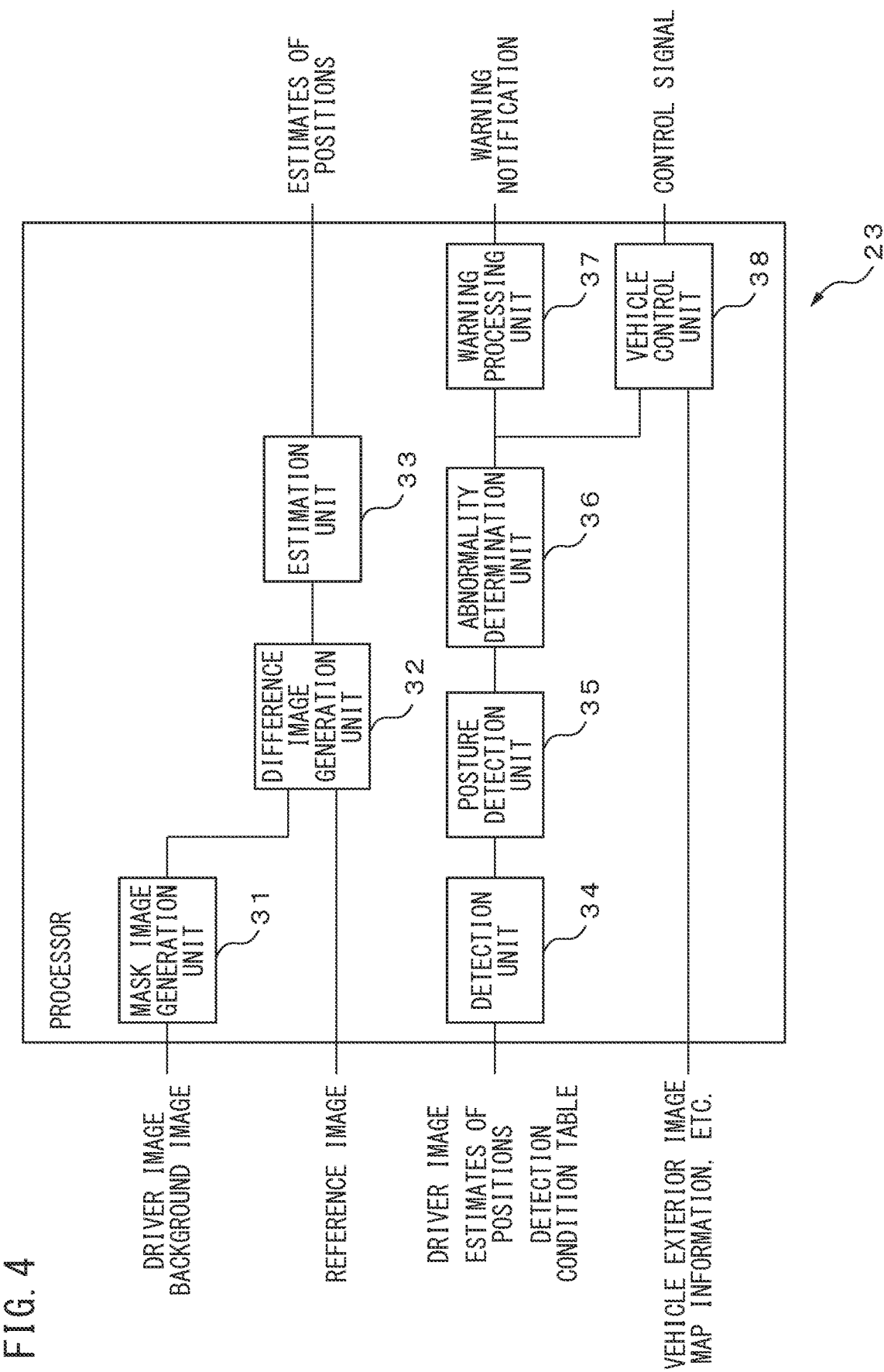
FIG. 4 is a functional block diagram of a processor of the ECU, related to a seat position estimation process.

FIG. 4 is a functional block diagram of the processor 23, related to the control process for driving the vehicle including the seat position estimation process. The processor 23 includes a mask image generation unit 31, a difference image generation unit 32, an estimation unit 33, a detection unit 34, a posture detection unit 35, an abnormality determination unit 36, a warning processing unit 37, and a vehicle control unit 38. These units included in the processor 23 are functional modules, for example, implemented by a computer program executed by the processor 23, or may be dedicated operating circuits provided in the processor 23. Of these units included in the processor 23, processing executed by the mask image generation unit 31, the difference image generation unit 32, and the estimation unit 33 corresponds to the seat position estimation process. The mask image generation unit 31, the difference image generation unit 32, and the estimation unit 33 executes the seat position estimation process on a driver image received by the ECU 4 from the driver monitor camera 2, at predetermined timing. In addition, the detection unit 34 detects the driver's face from the latest driver image at predetermined intervals by using the result of the seat position estimation process. The posture detection unit 35, the abnormality determination unit 36, the warning processing unit 37, and the vehicle control unit 38 then determines whether the driver's condition is abnormal, based on the detected driver's face, and controls the vehicle 10 or warns the driver according to the result of determination.

The mask image generation unit 31 detects a region representing the driver (hereafter a "driver region") in a driver image received by the ECU 4 from the driver monitor camera 2 at predetermined timing, by background subtraction between the driver image and a background image. The mask image generation unit 31 then generates a mask image by masking the driver region in the driver image.

The predetermined timing is preferably timing at which the driver has finished setting the positions of the driver's seat and the steering. This is because the positions of the driver's seat and the steering are not supposed to be frequently changed after the driver finishes setting the positions of the driver's seat and the steering. Thus the predetermined timing may be, for example, timing after a certain time from when an ignition switch of the vehicle 10 is turned on. Alternatively, the predetermined timing may be timing when the speed of the vehicle 10 first exceeds a predetermined speed threshold (e.g., 10 km/h) after the ignition switch of the vehicle 10 is turned on. Alternatively, the predetermined timing may be timing after a predetermined period from the last execution of the seat position estimation process. When the driver's face cannot be detected from a driver image, the detection condition may not be appropriate. Thus the predetermined timing may be timing when the ratio of the number of driver images from which the driver's face is not detected to the number of time-series driver images in the most recent predetermined period exceeds a predetermined ratio.

As background subtraction, the mask image generation unit 31 calculates the absolute value of the difference in luminance between corresponding pixels of a driver image and a background image. The mask image generation unit 31 then identifies a set of pixels where the absolute value of the difference in luminance is not less than a predetermined luminance difference threshold as a driver region representing the driver. When the driver image and the background image are represented in a color coordinate system that does not include an explicit luminance component, such as an RGB color coordinate system, the mask image generation unit 31 converts the color coordinate system of the driver image and the background image into an HLS color coordinate system. The mask image generation unit 31 then calculates the absolute value of the difference in luminance between corresponding pixels, using the luminance components of pixels of the driver image and the background image. Further, multiple background images corresponding to levels of brightness in the vehicle interior may be pre-stored in the memory 22. In this case, the mask image generation unit 31 reads a background image associated with the level of brightness closest to a measured value of light quantity by a light quantity sensor (not illustrated) mounted on the vehicle 10 from the memory 22, and uses the read image for background subtraction.

The mask image generation unit 31 changes the values of pixels included in the driver region in the driver image to a predetermined value to generate a mask image in which the driver region is masked.

Figure 5:
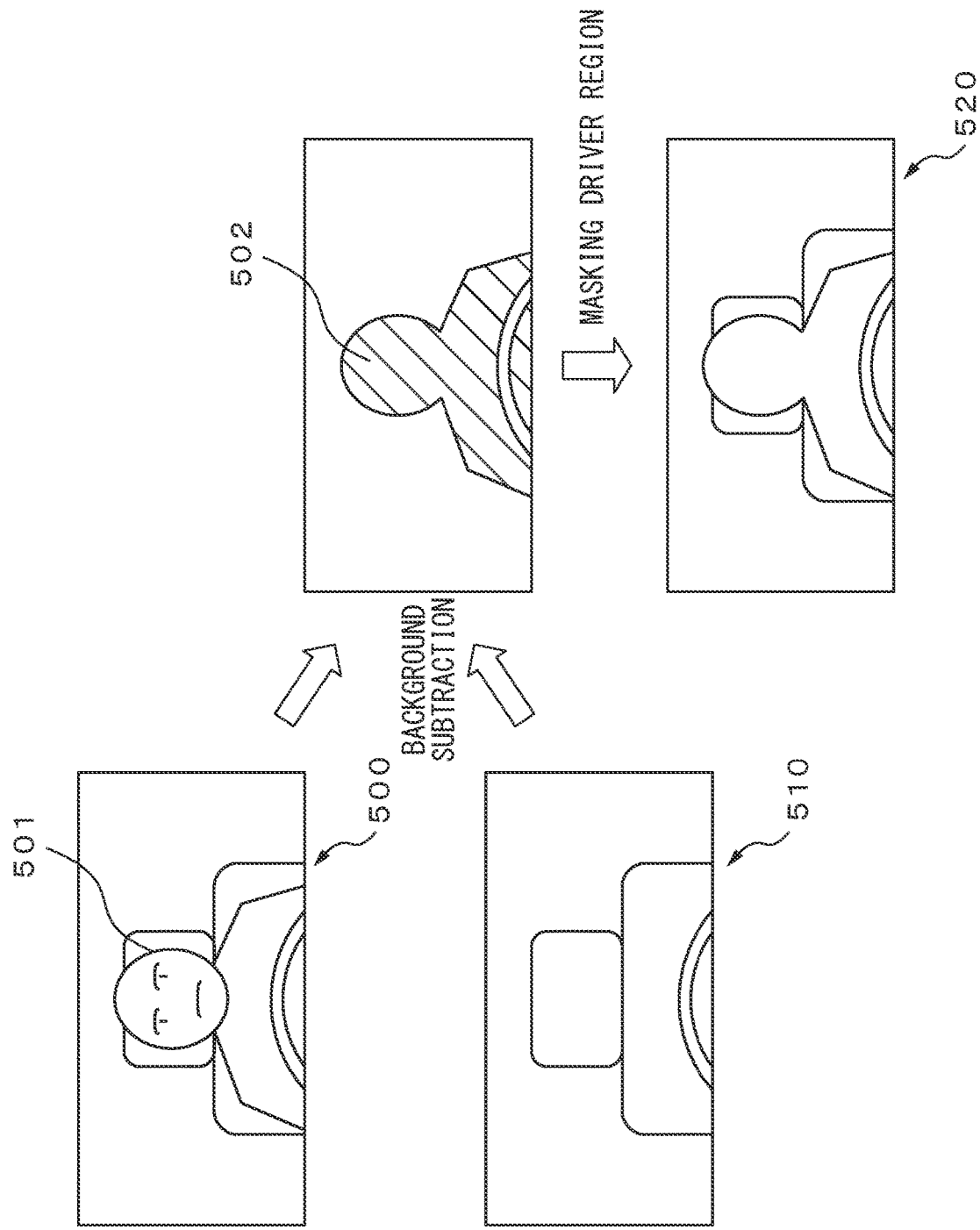
FIG. 5 is a schematic diagram for explaining generation of a mask image.

FIG. 5 is a schematic diagram for explaining generation of a mask image. A driver image 500 represents a driver 501. A driver region 502 representing the driver 501 in the driver image 500 is identified by background subtraction between the driver image 500 and a background image 510 that does not represent a driver. A mask image 520 is generated by changing the values of pixels in the driver region 502 of the driver image 500 to a predetermined value to mask the driver region 502.

The mask image generation unit 31 may detect a driver region, using time-series driver images obtained before and after the predetermined timing. For example, the mask image generation unit 31 detects an individual driver region for each of the driver images by background subtraction between each driver image and a background image. The mask image generation unit 31 then determines a region of the union or the product set of the individual driver regions of the respective driver images as a driver region anew. The mask image generation unit 31 generates a mask image by masking the driver region determined in one of the time-series driver images. In this way, the mask image generation unit 31 can mask a region in a driver image in which the driver probably exists, more reliably.

The mask image generation unit 31 passes the generated mask image to the difference image generation unit 32.

The difference image generation unit 32 generates a difference image between the mask image and each of one or more reference images. Each reference image represents the interior of the vehicle 10 where the driver's seat and the steering are set at predetermined positions. When multiple reference images are prepared, different reference images represent different combinations of the positions of the driver's seat and the steering. In particular, the multiple reference images preferably include two or more reference images in which only one of movable portions of the driver's seat and the steering is set at a position that differs among the reference images. For example, it is preferable to prepare two or more reference images in which the position of the seating surface of the driver's seat and the positions in the depth direction and up-and-down direction of the steering are fixed and only the slope of the backrest of the driver's seat differs. Alternatively, it is preferable to prepare two or more reference images in which the position of the seating surface and the slope of the backrest of the driver's seat and the position in the up-and-down direction of the steering are fixed and only the position in the depth direction of the steering differs. This clarifies the difference in the position of a particular movable portion between the mask image and a corresponding reference image, in an individual difference image.

For each of the one or more reference images, the difference image generation unit 32 calculates the absolute value of the difference between pixel values of corresponding pixels of the reference image and the mask image, and generates a difference image so that an individual pixel has a value equal to the absolute value of the difference between pixel values of corresponding pixels. When the reference image and the mask image are color images, the difference image generation unit 32 may generate a difference image by executing the above-described processing for each color component. In this way, the difference between the positions of the driver's seat and the steering represented in the reference image and those represented in the mask image are highlighted in each difference image.

Alternatively, the difference image generation unit 32 may apply a predetermined edge detection filter to each reference image and the mask image to generate images representing the intensity of edges. For each reference image, the difference image generation unit 32 may then calculate the absolute value of the difference between pixel values of corresponding pixels of an edge reference image generated from the reference image and an edge mask image generated from the mask image. In this case also, the difference image generation unit 32 generates a difference image so that an individual pixel has a value equal to the absolute value of the difference between pixel values of corresponding pixels. As the predetermined edge detection filter, the difference image generation unit 32 can use, for example, a Sobel filter, a Prewitt filter, or a Laplacian filter.

The difference image generation unit 32 passes the difference images generated for the respective reference images to the estimation unit 33.

The estimation unit 33 inputs each of the difference images, which are generated for the respective reference images, into a first classifier that estimates the position of the driver's seat and a second classifier that estimates the position of the steering. In this way, the estimation unit 33 determines individual estimates of the positions of the driver's seat and the steering for each difference image. As the first and second classifiers, the estimation unit 33 can use, for example, a deep neural network (DNN) having architecture of a convolutional neural network (CNN) type including multiple convolution layers. Alternatively, as the first and second classifiers, the estimation unit 33 may use a DNN having architecture of a self-attention network (SAN) type. These classifiers are trained in advance in accordance with a predetermined training technique, such as backpropagation, with a large number of training images representing a driver's seat or steering at various positions.

In a driver image, an area that may represent steering and an area that may represent a driver's seat are estimated. When the driver monitoring camera 2 is provided on or near the instrument panel as described above, the steering is closer to the driver monitoring camera 2 than the driver's seat is. For this reason, the area representing the steering in a driver image is larger than the area representing the driver's seat. Thus, into the second classifier, which estimates the position of the steering, the estimation unit 33 inputs a whole difference image. Into the first classifier, which estimates the position of the driver's seat, the estimation unit 33 may input only an area in the difference image that may represent the driver's seat.

According to a modified example, the estimation unit 33 may input a whole difference image into both the first and second classifiers. Alternatively, a single classifier may be trained in advance to estimate both the positions of the driver's seat and the steering. In this case, the estimation unit 33 can determine individual estimates of both the positions of the driver's seat and the steering by inputting a difference image into the single classifier.

The estimation unit 33 calculates a statistically representative value, e.g., an average or median, of the individual estimates of the position of the driver's seat estimated from the respective difference images as an estimate of the position of the driver's seat. Similarly, the estimation unit 33 calculates a statistically representative value of the individual estimates of the position of the steering estimated from the respective difference images as an estimate of the position of the steering. When only one reference image is prepared, the individual estimate of the position of the driver's seat calculated by the first classifier for a difference image obtained based on the difference between the reference image and the mask image is the statistically representative value. In other words, the individual estimate itself is the estimate of the position of the driver's seat. Similarly, the individual estimate of the position of the steering calculated by the second classifier for the difference image obtained based on the difference between the reference image and the mask image is the estimate of the position of the steering.

A tolerable range of the position of the driver's seat may be preset for each reference image. The estimation unit 33 selects individual estimates of the position included in the respective tolerable ranges set for the reference images used for generating the difference images from the individual estimates of the position of the driver's seat estimated from the respective difference images. The estimation unit 33 may then calculate a statistically representative value of the selected individual estimates as an estimate of the position of the driver's seat. Similarly, a tolerable range of the position of the steering may be preset for each reference image. The estimation unit 33 selects individual estimates of the position included in the respective tolerable ranges set for the reference images used for generating the difference images from the individual estimates of the position of the steering estimated from the respective difference images. The estimation unit 33 may then determine a statistically representative value of the selected individual estimates as an estimate of the position of the steering.

Figure 6:
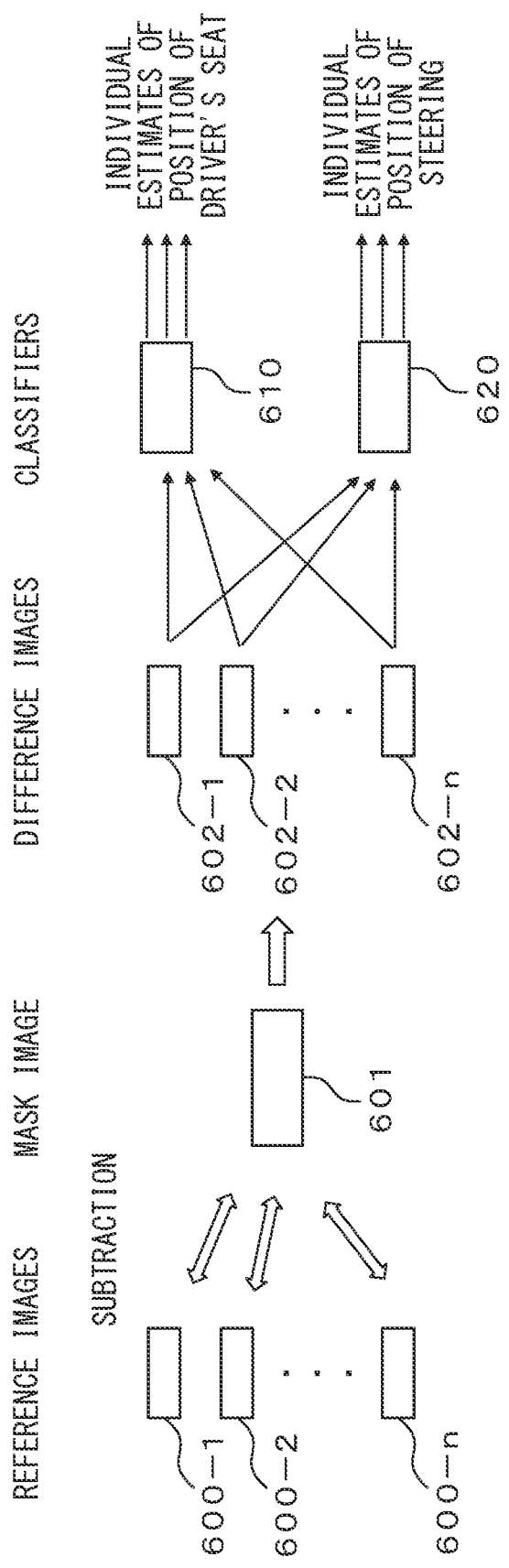
FIG. 6 is a schematic diagram for explaining generation of difference images and calculation of estimates of positions.

FIG. 6 is a schematic diagram for explaining generation of difference images and calculation of estimates of positions. In this example are prepared a number, n, of reference images 600-1 to 600-n (n is an integer not less than two) among which the combination of the positions of the driver's seat and the steering differs. For each of the reference images 600-1 to 600-n, a difference image between the reference image and a mask image 601 is generated. More specifically, a difference image 602-i (i=1, 2, . . . , n) is generated from the reference image 600-i and the mask image 601. The generated difference images 602-1 to 602-n are inputted into the first classifier 610 and the second classifier 620 one by one. As described above, into the first classifier 610 may be inputted only a region 603 in the difference image 602-i that may represent the driver's seat whereas into the second classifier 620 may be inputted the whole difference image 602-i. As a result, individual estimates of the positions of the driver's seat and the steering are calculated for each of the difference images 602-1 to 602-n.

FIG. 7 is a diagram for explaining the relationship between tolerable ranges of the position of the driver's seat that are set for respective reference images, individual estimates of the position calculated by the first classifier, and a finally estimated position of the driver's seat. In this example, assume that reference images 0 to 11 represent a driver's seat of which the slope angle of the backrest differs among the reference images, and that an estimate of the slope angle of the backrest of the driver's seat is outputted by the first classifier in units of 5 degrees in the range of 10 to 40 degrees. For reference images 0 to 2, the tolerable range of the slope angle is set to the range of 10 to 25 degrees; for reference images 3 to 5, to the range of 20 to 35 degrees; for reference images 6 to 8, to the range of 25 to 40 degrees; and for reference images 9 to 11, to the range of 15 to 30 degrees.

In FIG. 7, stars 701 indicate individual estimates of the slope angle of the driver's seat respectively calculated by the first classifier from difference images calculated for reference images 0 to 11. In this example, as for reference images 5 and 8, the individual estimates of the slope angle of the driver's seat are outside the respective tolerable ranges. Hence, the individual estimates calculated from the difference images corresponding to reference images 5 and 8 are excluded in final estimation of the slope angle of the backrest of the driver's seat. A final estimate of the slope angle of the backrest of the driver's seat is calculated as a statistically representative value of the individual estimates calculated from the difference images corresponding to reference images 0 to 4, 6, 7, and 9 to 11.

The estimation unit 33 stores the estimates of the positions of the driver's seat and the steering in the memory 22.

Figure 8:
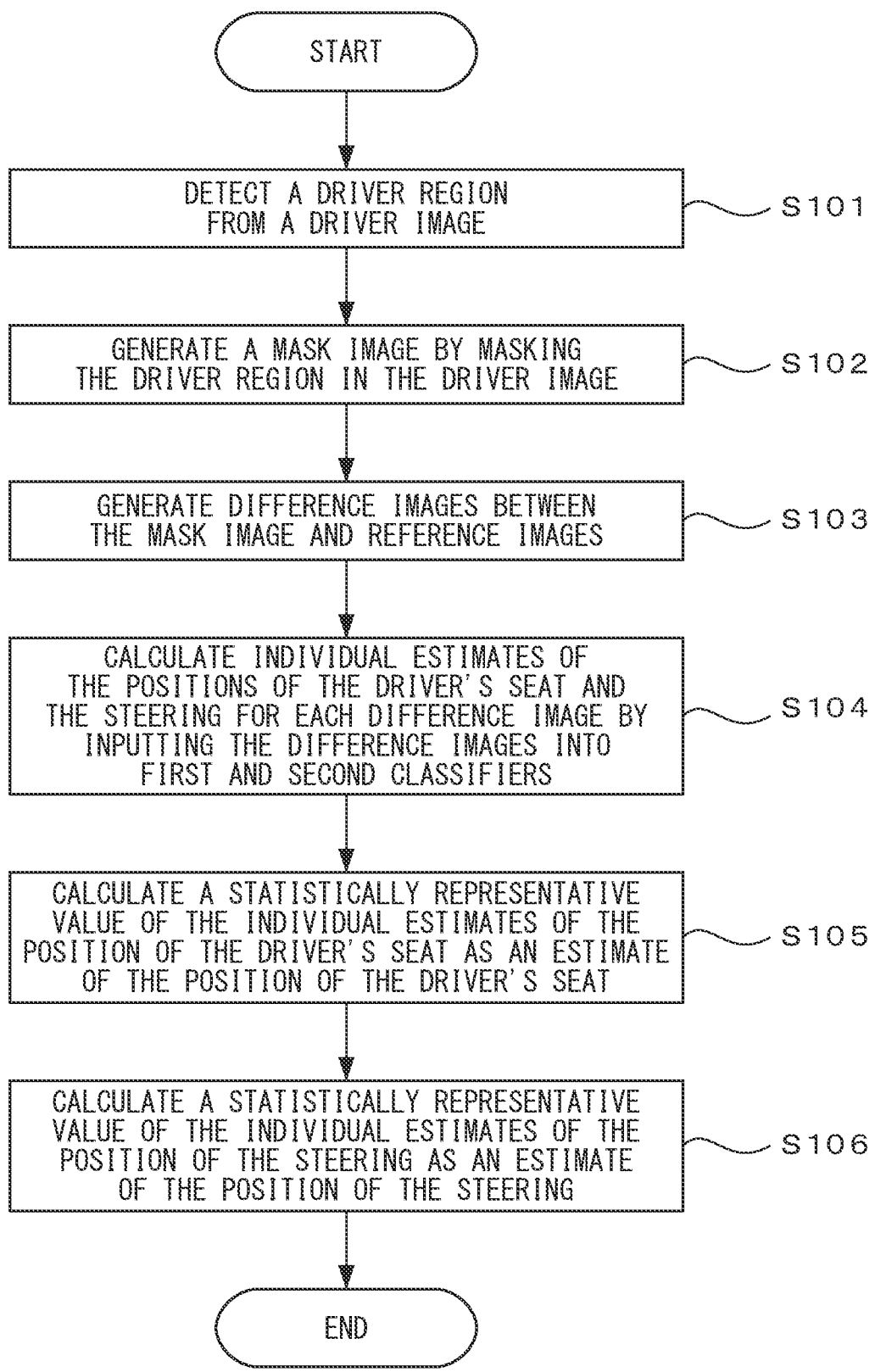
FIG. 8 is an operation flowchart of the seat position estimation process executed by the processor of the ECU of a vehicle.

FIG. 8 is an operation flowchart of the seat position estimation process executed by the processor 23. The processor 23 executes the seat position estimation process in accordance with the operation flowchart described below at the predetermined timing.

The mask image generation unit 31 of the processor 23 detects a driver region from a driver image by background subtraction between the driver image and a background image (step S101). Then the mask image generation unit 31 generates a mask image by masking the driver region in the driver image, i.e., by changing the values of pixels in the driver region to a predetermined value (step S102).

The difference image generation unit 32 of the processor 23 generates a difference image between the mask image and each of one or more reference images (step S103).

The estimation unit 33 of the processor 23 inputs each of the difference images generated for the respective reference images into the first and second classifiers, thereby calculating individual estimates of the positions of the driver's seat and the steering for each difference image (step S104). Then the estimation unit 33 calculates a statistically representative value of the individual estimates of the position of the driver's seat estimated from the respective difference images as an estimate of the position of the driver's seat (step S105). Similarly, the estimation unit 33 calculates a statistically representative value of the individual estimates of the position of the steering estimated from the respective difference images as an estimate of the position of the steering (step S106). After step S106, the processor 23 terminates the seat position estimation process.

The detection unit 34 detects a region representing the driver's face (hereafter a "face region") from a driver image received by the ECU 4 from the driver monitor camera 2.

For example, the detection unit 34 detects a candidate face region from a driver image by inputting the driver image into a classifier that has been trained to detect a driver's face from an image. As such a classifier, the detection unit 34 can use, for example, a DNN having architecture of a CNN or SAN type. Alternatively, as such a classifier, the detection unit 34 may use a classifier based on a machine learning technique other than a DNN, such as a support vector machine or an AdaBoost classifier. Such a classifier is trained in advance in accordance with a predetermined training technique, such as backpropagation, with a large number of training images representing a driver's face.

The detection unit 34 determines whether the candidate face region outputted by the classifier satisfies a detection condition, and determines the candidate as a face region when the candidate face region satisfies the detection condition. The detection condition is set as an estimated region where the driver's face is supposed to exist in a driver image and a tolerable range of the size of a face region in a driver image. More specifically, the detection unit 34 determines that the candidate face region outputted by the classifier satisfies the detection condition, in the case where the candidate face region is within the estimated region indicated by the detection condition, and where the size of the face region is within the tolerable range of the size indicated by the detection condition. The detection condition is set depending on the combination of the positions of the driver's seat and the steering. In the present embodiment, a detection condition table representing detection conditions for respective combinations of the positions of the driver's seat and the steering is prestored in the memory 22. More specifically, as the seating surface of the driver's seat moves forward or as the slope angle of the backrest decreases, the position of the driver approaches the driver monitoring camera 2. As the position of the driver approaches the driver monitoring camera 2, the region representing the driver's face enlarges in the driver image. Additionally, as the position of the driver approaches the driver monitoring camera 2, the amount of the driver's movement in driver images caused by the driver's movement also increases. Thus, as the seating surface of the driver's seat moves forward or as the slope angle of the backrest decreases, the estimated region indicated by the detection condition is set larger. In addition, since the region in the driver image representing the steering changes, depending on the position of the steering, the estimated region indicated by the detection condition is set so as not to include that region in the driver image representing the steering which depends on the position of the steering. The detection unit 34 identifies the detection condition corresponding to the combination of the estimates of the positions of the driver's seat and the steering determined by the estimation unit 33, by referring to the detection condition table, and uses the identified detection condition for detecting a face region.

The detection unit 34 notifies the posture detection unit 35 of information indicating the position and area of the detected face region (e.g., the coordinates of the upper left corner and the lower right corner of the face region).

The posture detection unit 35 detects the driver's posture, based on the face region detected from the driver image. In the present embodiment, the posture detection unit 35 detects the position and orientation of the driver's face as information representing the driver's posture.

The posture detection unit 35 detects feature points of the driver's face, such as the inner and outer canthi, the tip of the nose, and the corners of the mouth, from the face region of the driver image. Specifically, the posture detection unit 35 detects the feature points of the face by inputting the face region into a classifier that has been trained to detect feature points of a face represented in an image. As such a classifier, the posture detection unit 35 can use, for example, a DNN having architecture of a CNN type, a support vector machine, or an AdaBoost classifier. The classifier for detecting a face region may be integrated with the classifier for detecting feature points of a face. In this case, the detection unit 34 detects a face region and individual feature points of the face by inputting a driver image into the classifier. Alternatively, the posture detection unit 35 may detect individual feature points of the driver's face from the face region by template matching of the face region with templates representing feature points of a face or in accordance with another technique to detect feature points of a face.

The posture detection unit 35 fits the detected individual feature points of the face into a three-dimensional face model representing the three-dimensional shape of a face. The posture detection unit 35 then detects the orientation of the face of the three-dimensional face model best fitted by the feature points as the orientation of the driver's face. The posture detection unit 35 may detect the orientation of the driver's face, based on the driver image, in accordance with another technique to determine the orientation of a face represented in an image.

In addition, the posture detection unit 35 detects the centroid position of the face region in the driver image as the position of the driver's face.

The posture detection unit 35 may detect the driver's posture, based on the driver's looking direction. In this case, the posture detection unit 35 detects eye regions representing the driver's eyes from the face region. To this end, the posture detection unit 35 may detect eye regions of the left and right eyes by a technique similar to the above-described technique to detect feature points of a face. Further, the posture detection unit 35 detects the pupillary centroid and a corneal reflection image (Purkinje image) of the light source of the driver monitoring camera 2 by template matching of the left or right eye region, and detects the driver's looking direction, based on the positional relationship between the pupillary centroid and the Purkinje image. When none of the driver's left and right eye regions can be detected, the posture detection unit 35 determines that detection of the looking direction has failed.

The posture detection unit 35 notifies the abnormality determination unit 36 of the result of detection of the driver's posture regarding the driver image, i.e., the result of detection of the position and orientation of the driver's face. In the case where the driver's looking direction is detected, the posture detection unit 35 further notifies the abnormality determination unit 36 of the result of detection of the looking direction.

The abnormality determination unit 36 determines that the driver's condition is abnormal, when the driver's posture detected by the posture detection unit 35 satisfies the criterion of abnormality. In the present embodiment, the driver's posture is represented by the position and orientation of the driver's face, as described above. The criterion of abnormality is that the position or orientation of the driver's face has been outside a normal range for a period not shorter than a time threshold. Thus, whenever notified of the position and orientation of the driver's face by the posture detection unit 35, the abnormality determination unit 36 determines whether the position and orientation of the face are within preset normal ranges. When the position or orientation of the driver's face has been outside the normal range for a period not shorter than the time threshold, the abnormality determination unit 36 determines that the driver's condition is abnormal. In the case where the driver's looking direction is detected, whenever notified of the driver's looking direction by the posture detection unit 35, the abnormality determination unit 36 determines whether the looking direction is within a preset normal range. When the driver's looking direction has been outside the normal range for a period not shorter than the time threshold, the abnormality determination unit 36 may determine that the driver's condition is abnormal.

The abnormality determination unit 36 notifies the warning processing unit 37 and the vehicle control unit 38 of the result of determination whether the driver's condition is abnormal.

The warning processing unit 37 executes a predetermined warning process when the result of determination that the driver's condition is abnormal is received from the abnormality determination unit 36. For example, the warning processing unit 37 causes the speaker included in the notification device 3 to sound an alarm or output a voice signal for requesting the driver to be in a driving posture. Alternatively, the warning processing unit 37 causes the display included in the notification device 3 to display a warning message for requesting the driver to be in a driving posture. Alternatively, the warning processing unit 37 vibrates the vibrator included in the notification device 3.

When the result of determination that the driver is in a normal condition is received from the abnormality determination unit 36 after starting the warning process for requesting the driver to be in a driving posture via the notification device 3, the warning processing unit 37 stops executing the warning process.

The vehicle control unit 38 controls the vehicle 10 according to a driving control level applied to the vehicle 10 until the result of determination that the driver's condition is abnormal is received from the abnormality determination unit 36. When the driving control level applied to the vehicle 10 is such that the driver does not participate in driving the vehicle 10, the vehicle control unit 38 controls the vehicle 10 so that the vehicle 10 keeps traveling along a current lane. To achieve this, the vehicle control unit 38 detects lane-dividing lines dividing the current lane from adjoining lanes as well as moving objects, such as other traveling vehicles around the vehicle 10, from an image generated by the vehicle exterior camera. The vehicle control unit 38 compares the detected lane-dividing lines with the map information to estimate the position and orientation of the vehicle 10. Based on the result of estimation of the position and orientation of the vehicle 10 and the result of detection of individual moving objects around the vehicle 10, the vehicle control unit 38 controls the vehicle 10 so that the vehicle 10 does not collide with any of the moving objects and travels along the current lane.

When the result of determination that the driver's condition is abnormal has been received for a certain period from the abnormality determination unit 36, the vehicle control unit 38 controls the vehicle 10 so that the vehicle 10 makes an emergency stop. The vehicle control unit 38 may control the vehicle 10 so that the vehicle 10 makes an emergency stop immediately when the result of determination that the driver's condition is abnormal is received from the abnormality determination unit 36. Specifically, the vehicle control unit 38 may stop the vehicle 10 after moving the vehicle 10 to a road shoulder, based on the result of estimation of the position and orientation of the vehicle 10, the result of detection of individual moving objects around the vehicle 10, and the map information.

Figure 9:
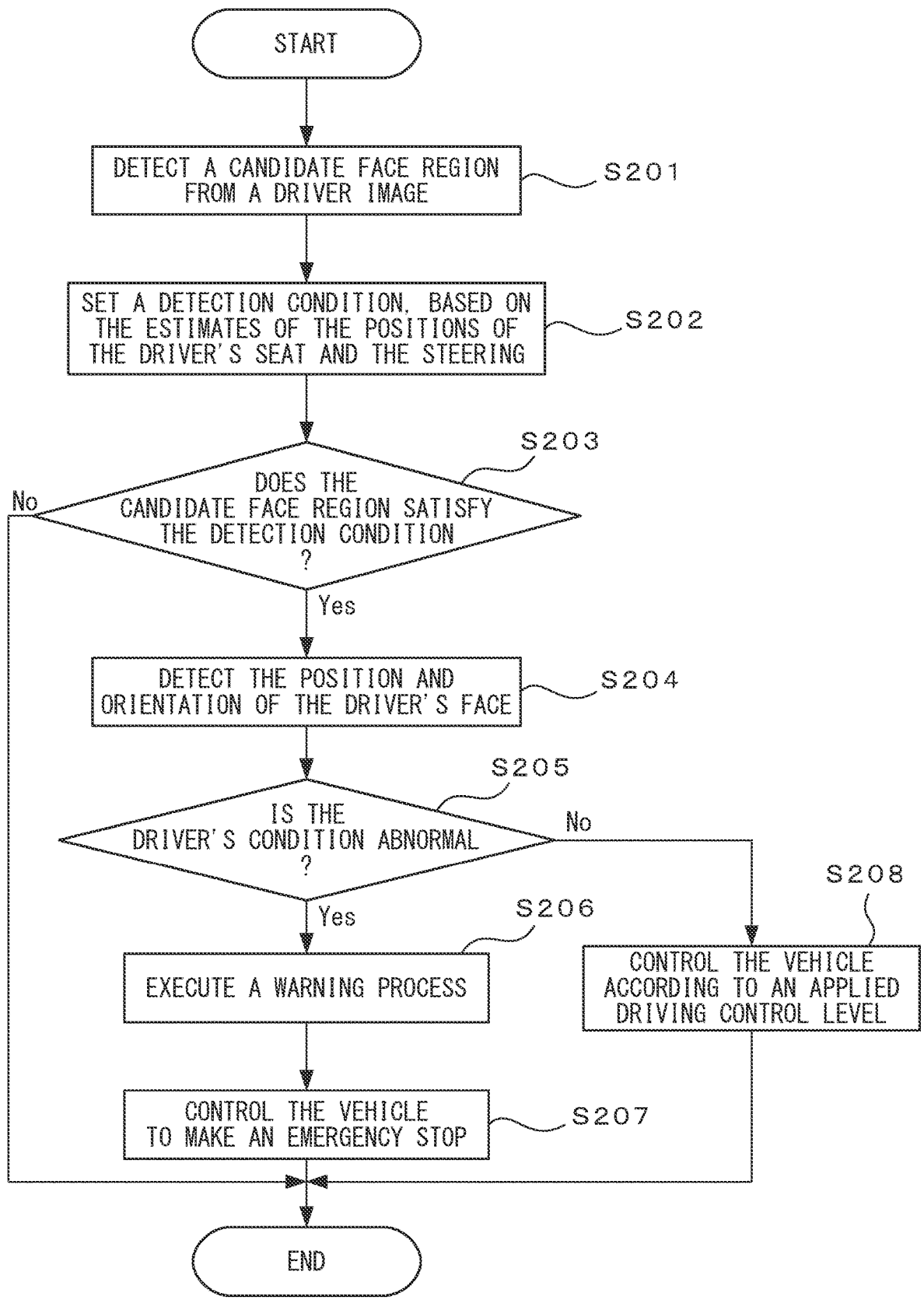
FIG. 9 is an operation flowchart of a vehicle control process executed by the processor of the ECU of the vehicle.

FIG. 9 is an operation flowchart of a vehicle control process executed by the processor 23. The processor 23 executes the vehicle control process in accordance with the operation flowchart described below at predetermined intervals.

The detection unit 34 of the processor 23 detects a candidate face region from the latest driver image (step S201). The detection unit 34 sets a detection condition, based on the combination of the estimates of the positions of the driver's seat and the steering (step S202). Then the detection unit 34 determines whether the detected candidate face region satisfies the detection condition (step S203).

When the candidate face region does not satisfy the detection condition (No in step S203), the detection unit 34 determines that detection of the driver's face has failed. Then the processor 23 terminates the vehicle control process. When the candidate face region satisfies the detection condition (Yes in step S203), the detection unit 34 determines that detection of the driver's face has succeeded. Then the posture detection unit 35 of the processor 23 detects the position and orientation of the driver's face, based on the face region detected from the driver image (step S204). As described above, the posture detection unit 35 may detect the driver's looking direction from the face region.

The abnormality determination unit 36 of the processor 23 determines whether the driver's condition is abnormal, based on the position and orientation of the driver's face (step S205). Specifically, the abnormality determination unit 36 determines whether the driver's condition is abnormal, based on the orientation and position of the driver's face or the looking direction in time-series driver images in the most recent predetermined time. When it is determined by the abnormality determination unit 36 that the driver's condition is abnormal (Yes in step S205), the warning processing unit 37 of the processor 23 notifies the driver of a warning for requesting the driver to be in a driving posture, via the notification device 3 (step S206). In addition, the vehicle control unit 38 of the processor 23 controls the vehicle 10 so that the vehicle 10 makes an emergency stop (step S207).

When it is determined by the abnormality determination unit 36 that the driver is in a normal condition in step S205 (No in step S205), the vehicle control unit 38 controls the vehicle 10 according to a driving control level applied to the vehicle 10 (step S208).

After step S207 or S208, the processor 23 terminates the vehicle control process.

As has been described above, the device for estimating a seat position generates a mask image in which the region representing the driver is masked, from an image representing the interior of the vehicle where the driver is riding. Further, the device generates a difference image between the mask image and each of at least one reference image representing the vehicle interior where the driver's seat and the steering are at predetermined positions. The device inputs the generated difference images into the classifiers to obtain estimates of the positions of the driver's seat and the steering. In this way, the device can estimate the position of a driver's seat from images representing the interior of a vehicle.

According to a modified example, the mask image generation unit 31 may identify a driver region by a method other than background subtraction. For example, the mask image generation unit 31 detects a candidate region representing the driver by executing processing similar to the processing of the detection unit 34 on each of time-series driver images. The mask image generation unit 31 further determines the region of the product set of the candidate regions detected from the respective driver images. The product set region, which is determined as a region representing the driver in each driver image, is highly likely to actually represent the driver. Thus the mask image generation unit 31 may identify the product set region as a driver region.

In some vehicles, the driver monitoring camera 2 is mounted at a position such that the position of the steering does not affect the accuracy of detection a face region from a driver image. In such a case, the device for estimating a seat position may estimate only the position of the driver's seat without estimating the position of the steering. In this case, the reference images only have to represent a driver's seat whose position differs among the reference images, regardless of the position of the steering. Further, processing related to calculation of individual estimates of the position of the steering by the second classifier and calculation of an estimate of the position of the steering based on the individual estimates is omitted in the estimation unit 33. According to this modified example, the computational burden of the processor 23 is reduced because of omission of processing related to estimation of the position of the steering.

The computer program for achieving the functions of the processor 23 of the ECU 4 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A device for estimating a seat position, comprising:
    a memory configured to store one or more reference images representing the interior of a vehicle where a driver's seat of the vehicle is at a predetermined position that differs among the one or more reference images; and
    a processor configured to:
        identify a region representing a driver in a driver image generated while the driver is in the vehicle by a camera provided to take pictures of the interior of the vehicle,
        generate a mask image by masking the identified region,
        generate one or more difference images based on the difference between the mask image and each of the one or more reference images,
        determine an individual estimate of the position of the driver's seat for each of the one or more difference images by inputting each of the difference images into a classifier which has been trained to estimate the position of the driver's seat, and
        calculate a statistically representative value of the individual estimates for the one or more difference images as an estimate of the position of the driver's seat.

2. The device according to claim 1, wherein a tolerable range of the position of the driver's seat is set for each of the one or more reference images, and
    the processor calculates a statistically representative value of individual estimates included in the respective tolerable ranges of the reference images corresponding to the difference images among the individual estimates of the position of the driver's seat determined for the one or more difference images, as the estimate of the position of the driver's seat.

3. The device according to claim 1, wherein the processor generates an edge mask image by applying an edge detection filter to the mask image, and generates the one or more difference images based on the difference between the edge mask image and each of one or more edge reference images obtained by applying the edge detection filter to the one or more reference images.

4. The device according to claim 1, wherein the one or more reference images further represent steering of the vehicle whose position differs among the reference images, and
    the processor is further configured to determine an individual estimate of the position of the steering for each of the one or more difference images by inputting each of the difference images into a second classifier which has been trained to estimate the position of the steering, and calculate a statistically representative value of the individual estimates of the position of the steering for the one or more difference images as an estimate of the position of the steering.

5. A method for estimating a seat position, comprising:
    identifying a region representing a driver in a driver image generated while the driver is in a vehicle by a camera provided to take pictures of the interior of the vehicle;
    generating a mask image by masking the identified region;
    generating one or more difference images based on the difference between the mask image and each of one or more reference images representing the interior of the vehicle where a driver's seat of the vehicle is at a predetermined position that differs among the one or more reference images;
    determining an individual estimate of the position of the driver's seat for each of the one or more difference images by inputting each of the difference images into a classifier that has been trained to estimate the position of the driver's seat; and
    calculating a statistically representative value of the individual estimates for the one or more difference images as an estimate of the position of the driver's seat.

6. A non-transitory recording medium that stores a computer program for estimating a seat position, the computer program causing a processor mounted on a vehicle to execute a process comprising:
    identifying a region representing a driver in a driver image generated while the driver is in the vehicle by a camera provided to take pictures of the interior of the vehicle;
    generating a mask image by masking the identified region;
    generating one or more difference images based on the difference between the mask image and each of one or more reference images representing the interior of the vehicle where a driver's seat of the vehicle is at a predetermined position that differs among the one or more reference images;
    determining an individual estimate of the position of the driver's seat for each of the one or more difference images by inputting each of the difference images into a classifier that has been trained to estimate the position of the driver's seat; and
    calculating a statistically representative value of the individual estimates for the one or more difference images as an estimate of the position of the driver's seat.

* * * * *